(12) United States Patent
Russell

(10) Patent No.: US 11,295,313 B1
(45) Date of Patent: Apr. 5, 2022

(54) FINANCIAL MANAGEMENT SYSTEM WITH ACCOUNT GUARDIAN OVERSIGHT

(71) Applicant: UIPCO, LLC, San Antonio, TX (US)

(72) Inventor: Ryan Thomas Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 81 days.

(21) Appl. No.: 16/730,431

(22) Filed: Dec. 30, 2019

(51) Int. Cl.
*G06Q 20/42* (2012.01)
*G06Q 20/40* (2012.01)
*H04W 4/029* (2018.01)
*G06Q 30/02* (2012.01)
*G06Q 20/02* (2012.01)

(52) U.S. Cl.
CPC ............ *G06Q 20/42* (2013.01); *G06Q 20/02* (2013.01); *G06Q 20/405* (2013.01); *G06Q 30/0214* (2013.01); *H04W 4/029* (2018.02)

(58) Field of Classification Search
CPC ...... G06Q 20/42; G06Q 20/02; G06Q 20/405; G06Q 20/0214
USPC ...................................................... 705/35, 44
See application file for complete search history.

(56) References Cited

U.S. PATENT DOCUMENTS

| 5,206,495 | A | 4/1993 | Kreft |
| 5,953,710 | A | 9/1999 | Fleming |
| 10,445,739 | B1 | 10/2019 | Sahni et al. |
| 10,554,654 | B1 | 2/2020 | Ramanathan et al. |
| 2003/0162565 | A1 | 8/2003 | Al-Khaja |
| 2009/0172793 | A1 | 7/2009 | Newstadt et al. |
| 2009/0254461 | A1 | 10/2009 | Walker et al. |
| 2009/0319353 | A1* | 12/2009 | Palmeri ................ G06Q 20/387 705/14.17 |
| 2012/0197793 | A1 | 8/2012 | Grigg et al. |
| 2013/0018792 | A1* | 1/2013 | Casey ................ G06Q 20/2295 705/44 |
| 2013/0346302 | A1 | 12/2013 | Purves et al. |
| 2014/0201077 | A1 | 7/2014 | Gama et al. |
| 2014/0279513 | A1 | 9/2014 | Dodds-Brown |
| 2015/0058214 | A1 | 2/2015 | Cohen |
| 2015/0120546 | A1 | 4/2015 | Fernandes |
| 2015/0348032 | A1 | 12/2015 | Ioveva et al. |
| 2015/0348185 | A1 | 12/2015 | Frost et al. |

(Continued)

OTHER PUBLICATIONS

Guardian-Based Financial Endorsement Enablement for Commerce An IP.com Prior Art Database Technical Disclosure Authors et al.: Disclosed Anonymously (Year: 2019).*

(Continued)

*Primary Examiner* — William E Rankins
(74) *Attorney, Agent, or Firm* — Plumsea Law Group, LLC

(57) ABSTRACT

A financial management system may include a device processor and a non-transitory computer readable medium including instructions, executable by the processor. The computer readable medium may include instructions for receiving purchase information regarding a pending purchase of a system user using an account; sending the purchase information, along with a request for approval of the purchase, to one or more personal electronic devices of a guardian of the account; receiving a response selected by the guardian; and selectively permitting the purchase based on the response selected by the guardian.

16 Claims, 13 Drawing Sheets

(56) References Cited

U.S. PATENT DOCUMENTS

| | | | |
|---|---|---|---|
| 2016/0162812 A1* | 6/2016 | Rowley | G06Q 50/30 |
| | | | 705/5 |
| 2017/0068938 A1* | 3/2017 | Narayana | G06Q 40/02 |
| 2017/0076274 A1 | 3/2017 | Royyuru et al. | |
| 2018/0047026 A1 | 2/2018 | Vaidyanathan et al. | |
| 2018/0225666 A1 | 8/2018 | Khan et al. | |
| 2019/0108524 A1* | 4/2019 | Nicholson | G06Q 20/3223 |
| 2019/0287106 A1* | 9/2019 | Sadeddin | G06Q 20/42 |
| 2019/0334884 A1 | 10/2019 | Ross et al. | |
| 2019/0370787 A1 | 12/2019 | Mueller et al. | |
| 2019/0385152 A1 | 12/2019 | Eu et al. | |
| 2020/0090148 A1 | 3/2020 | Lawrence et al. | |
| 2020/0211026 A1 | 7/2020 | Ross et al. | |

OTHER PUBLICATIONS

Non-Final Office Action dated Feb. 19, 2021 for U.S. Appl. No. 16/728,791.

Final Office Action dated Jun. 22, 2021 for U.S. Appl. No. 16/728,791.

\* cited by examiner

FINANCIAL MANAGEMENT SYSTEM WITH ACCOUNT GUARDIAN OVERSIGHT

TECHNICAL FIELD

The present disclosure generally relates to a financial management system and, more particularly, to a financial management system configured with guardian oversight of user purchases and actions.

BACKGROUND

For families with teens and/or college-age members, it may be desirable for guardians of such youth to have some oversight when it comes to use of bank accounts and other financial concerns. Similarly, an employer may also have similar concerns with respect to a corporate account that may be used by an employee. That is, the employer may wish to serve as guardian over that account with some oversight and control over what it is used for. However, such oversight is generally not available in real time, i.e., at point of sale. The oversight currently available comes after purchases are already made. Guardians of family and corporate accounts do not have real time right of refusal to prevent an undesired purchase. In addition, there may be a desire to encourage good lifestyle habits with monetary incentives. However, when a person is away from home, such as at college, it is difficult to track their daily activity.

The present disclosure addresses one or more of the issues discussed above.

SUMMARY

In one aspect, the present disclosure is directed to a financial management system, comprising a device processor and a non-transitory computer readable medium including instructions, executable by the processor. The computer readable medium may include instructions for receiving purchase information regarding a pending purchase of a system user using an account; sending the purchase information, along with a request for approval of the purchase, to one or more personal electronic devices of a guardian of the account; receiving a response selected by the guardian; and selectively permitting the purchase based on the response selected by the guardian.

In another aspect, the present disclosure is directed to a method of financial management. The method may include executing, with a device processor, the following steps stored in a non-transitory computer readable medium: receiving purchase information regarding a pending purchase of a system user using an account; sending the purchase information, along with a request for approval of the purchase, to one or more personal electronic devices of a guardian of the account; receiving a response selected by the guardian; and selectively permitting the purchase based on the response selected by the guardian.

In another aspect, the present disclosure is directed to a financial management system. The system may include a device processor and a non-transitory computer readable medium including instructions, executable by the processor. The computer readable medium may include instructions for receiving information regarding the actions of a system user and sending the information regarding the actions of the user to a guardian of the user, along with a proposal to send the user a financial award based on the information regarding the actions of the user.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
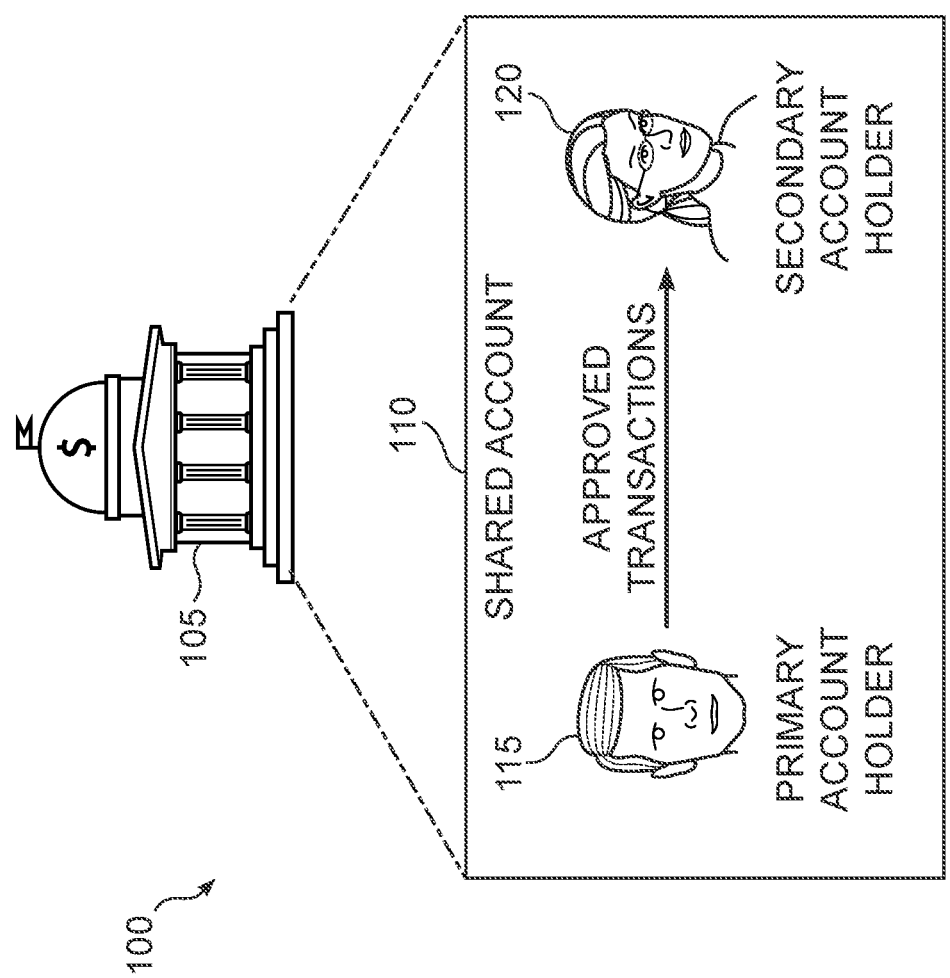
FIG. 1 is a schematic illustration of a shared bank account and two of its account holders.

FIG. 1 is a schematic illustration of a shared bank account and two of its account holders. As illustrated in FIG. 1, a financial system 100 may include a banking institution 105. FIG. 1 also represents a shared bank account 110, which is shared between a primary account holder or account guardian 115 and a secondary account holder or system user 120. As described below, a system may be provided that permits guardian 115 to have real time oversight of the banking activity of user 120.

Figure 2:
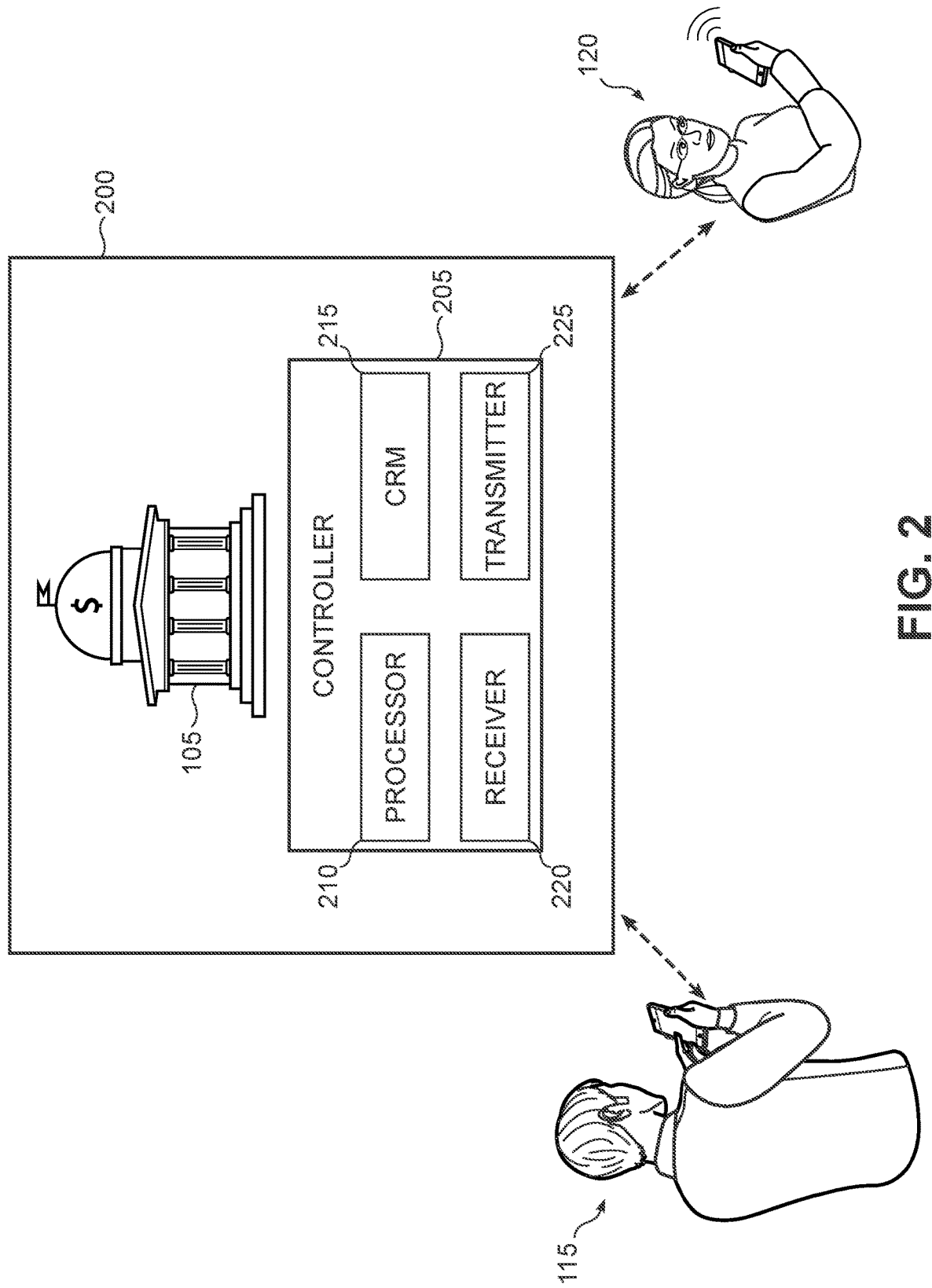
FIG. 2 is a schematic illustration of a financial management system according to an exemplary embodiment.

FIG. 2 is a schematic illustration of a financial management system according to an exemplary embodiment. FIG. 2 shows a financial management system 200 associated with banking institution 105. FIG. 2 further shows a schematic block diagram of various components of financial management system 200. For example, as shown in FIG. 2, system 200 may include a controller 205. Controller 205 may include various computing and communications hardware, such as servers, integrated circuits, displays, etc. Further, controller 205 may include a device processor 210 and a non-transitory computer readable medium 215 including instructions executable by device processor 210 to perform the processes discussed herein.

In some embodiments, the components of controller 205 may be disposed at a location remote from guardian 115 and user 120. In other embodiments, one or more components of controller 205 may be implemented on a device associated with user 120. For example, such components may be incorporated into a personal electronic device, such as a smart phone, of user 120.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 205 may include networking hardware configured to interface with other nodes of a network, such as a LAN, WLAN, or other networks. In Further, controller 205 may be configured to receive data from a plurality of sources and communicate information to one or more external destinations. Accordingly, controller 205 may include a receiver 220 and a transmitter 225. (It will be appreciated that, in some embodiments, the receiver and transmitter may be combined in a transceiver.) In some cases, communications between components may be made via the Internet, a cellular network, or other suitable communications network.

Any suitable communication platforms and/or protocols may be utilized for communication between controller 205 and other components of the system. Since the various sources of information may each have their own platform and/or protocol, system 200 may be configured to interface with each platform and/or protocol to receive the data.

As shown in FIG. 2, controller 205 of system 200 may communicate with personal electronic devices of user 120 and guardian 115. Such communications may be performed using any suitable communication platform and/or protocol as discussed above.

It will also be noted that the personal electronic devices of user 120 and guardian 115 may, themselves, each include controllers with a device processor and non-transitory computer readable medium including instructions executable by the processor. The personal electronic devices may include a receiver and transmitter. The receiver and transmitter may be incorporated into the controller or separate components of each personal electronic device.

It will be noted that the personal electronic devices of user 120 and guardian 115 may be any type of personal electronic device. While user 120 and guardian 115 are shown in the accompanying drawings with smart phones, exemplary alternatives may include stationary devices, such as desktop computers; portable computing devices, such as tablets and laptops; and wearable technology, such as smart watches, etc. Any of these personal electronic devices may have similar components as controller 205. For example, the personal electronic devices may include a device processor and non-transitory computer readable medium containing instructions executable by the processor. Such devices may also include a receiver, transmitter, transceiver, or other communication equipment. Skilled artisans will readily recognize suitable features and specifications for such personal electronic devices for use with the disclosed system.

In some embodiments, the financial management system may be configured to receive purchase information regarding a pending purchase of the system user. The system may then send the purchase information, along with a request for approval of the purchase, to one or more personal electronic devices of a guardian of the account shared with the system user. In addition, the system may be configured to receive a response selected by the guardian and selectively permit the purchase based on the response selected by the guardian.

Figure 3:
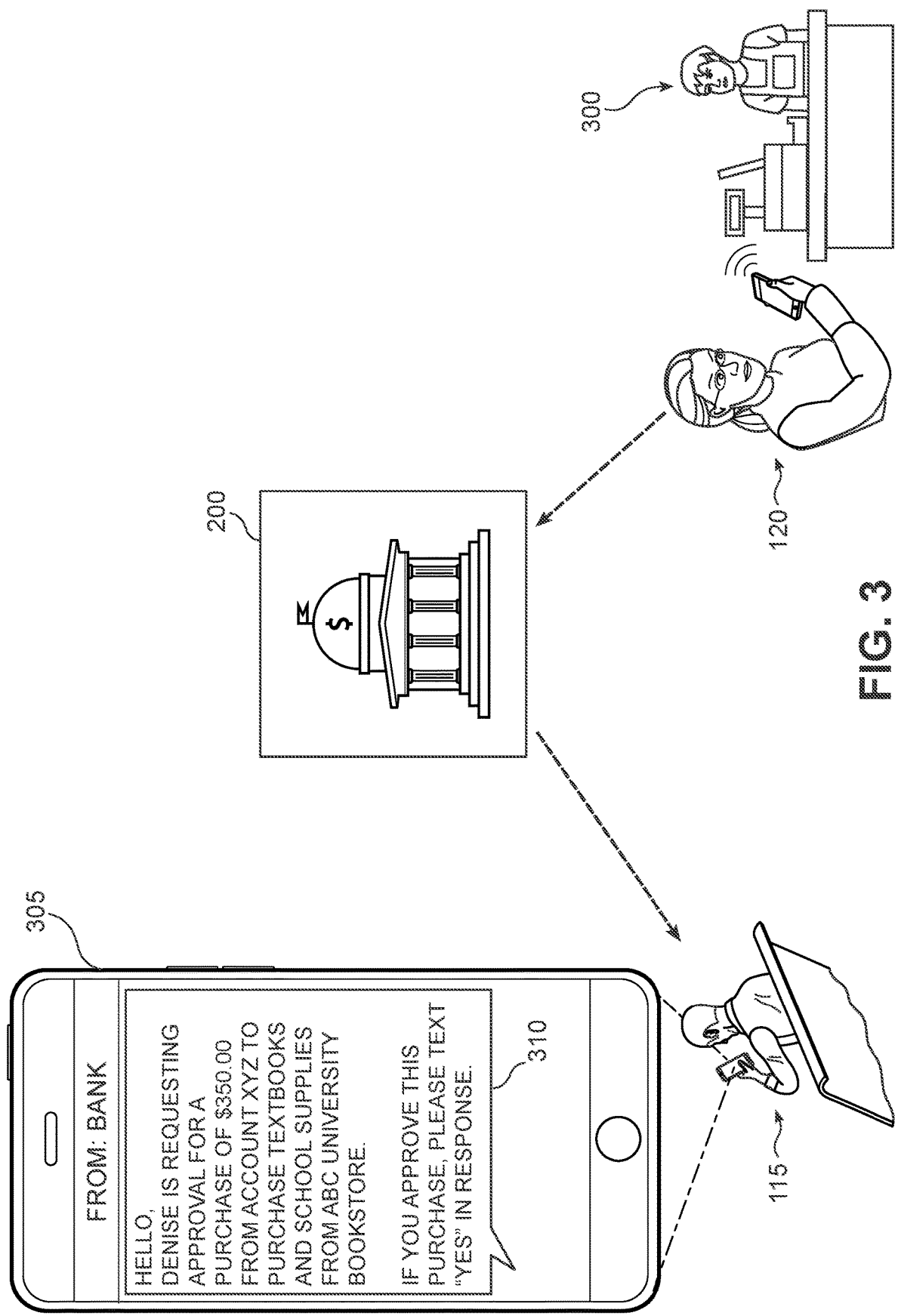
FIG. 3 is a schematic illustration of interaction between a system user and an account guardian with a financial management system including the passage, to the guardian, of information regarding a pending purchase by the user.

FIG. 3 is a schematic illustration of interaction between a system user and an account guardian with a financial management system including the passage, to the guardian, of information regarding a pending purchase by the user. As shown in FIG. 3, user 120 is attempting to make a purchase from a cashier 300. Information regarding this purchase is received by system 200 and communicated to guardian 115. This information can be sent to guardian 115 in any suitable manner. As shown in FIG. 3, a personal electronic device 305 of guardian 115 may receive the information in a text message 310. Message 310 may be presented through any suitable messaging system native to personal electronic device 305. Alternatively, an application ("app") dedicated for use with system 200 may provide a messaging/communication system for this purpose.

Message 310 may include a variety of information regarding the pending purchase. For example, as shown, message 310 may include information such as who the user is that is trying to make the purchase, how much the purchase is for, which account it is using, and where it is from (i.e., which vendor). It will be understood that any additional information may be included in the message. For example, in some embodiments, message 310 may include an itemized list including each item to be purchased.

As shown in FIG. 3, message 310 may solicit a response from guardian 115. As shown in FIG. 3, in some embodiments, user 115 may simply respond with a return message of "YES" or the like. In other embodiments, a pop-up window may include selections for "YES" and "NO." Other configurations for relaying the response of guardian 115 are also possible.

Figure 4:
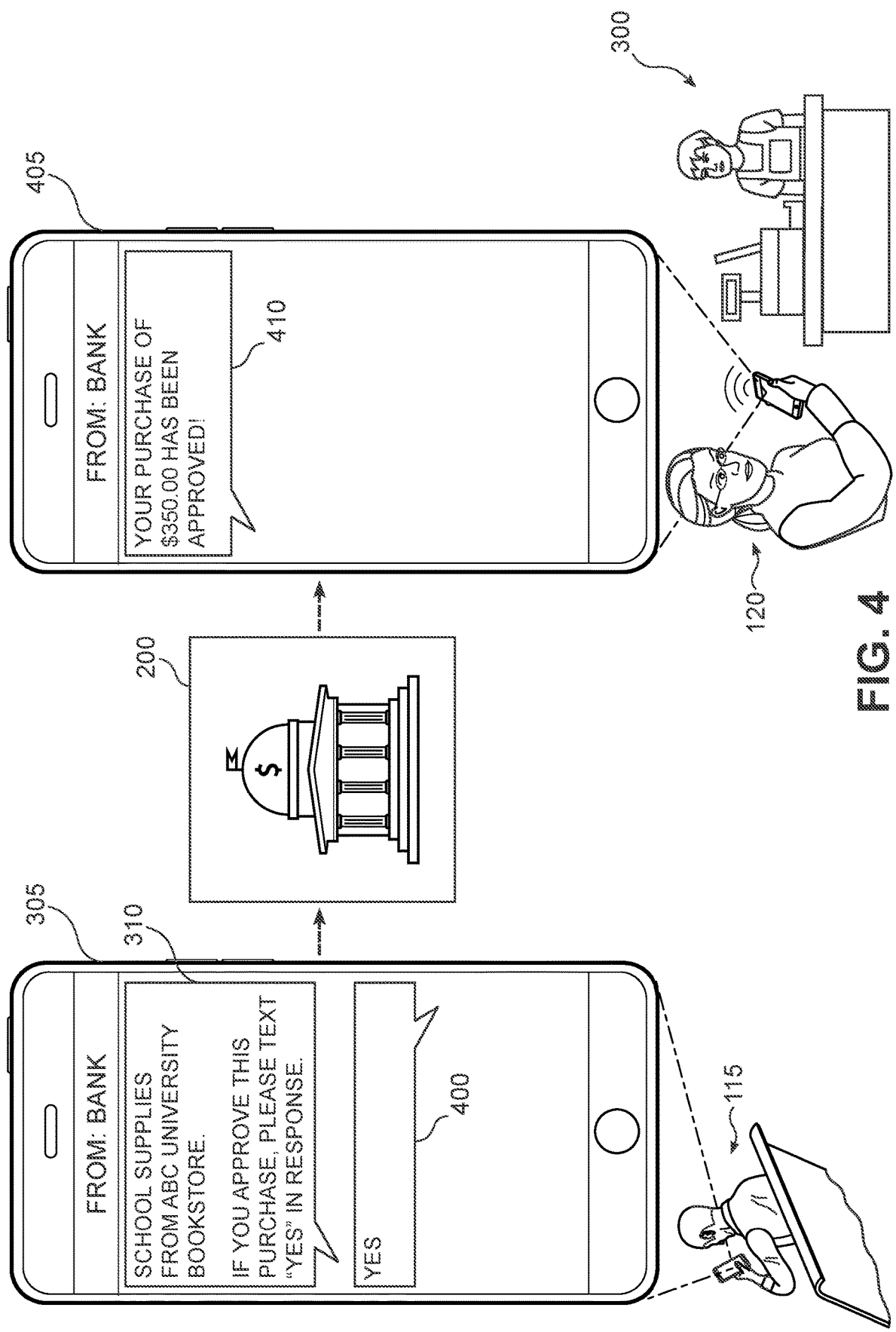
FIG. 4 is a schematic illustration of interaction between a system user and an account guardian with a financial management system including the passage of approval from the guardian to the user by the financial management system.

FIG. 4 is a schematic illustration of interaction between a system user and an account guardian with a financial management system including the passage of approval from the guardian to the user by the financial management system. As shown in FIG. 4, guardian 115 may send a return message 400 approving the purchase. Message 400 may be received by system 200, and system 200 may then send an alert message 410 to user 120 indicating that their purchase has been approved. Similar messaging may also occur if guardian 115 does not approve the purchase. Like approval messages, denial messages may also be conveyed in a variety of ways.

In some embodiments, system 200 may provide guardian 115 with an option to match the funds of the pending purchase by contributing an equal amount to an account of the system user. For example, if user 120 uses $100 for textbooks, guardian 115 may be prompted with a query as to whether they would like to contribute a matching amount to the college fund of user 120. Alternatively, guardian 115 may be asked if they would like to contribute a matching amount (or other amount) for a spending account. In some embodiments, the amount of contribution may be adjusted by guardian 115 such that the amount need not precisely match the amount of the purchase.

In some embodiments, different levels of authentication may be required for different types of purchases. For example, purchases for small amounts may be automatically approved, whereas purchases for higher amounts may require a responsive message from the guardian. Purchases of even higher amounts may require a password from the guardian. And purchases of still higher amounts may require the guardian's fingerprint, retinal scan, facial recognition or other form of authentication. Similarly, the items being purchased may also be tiered with respect to the level of authentication required. For example, purchases of essentials (e.g., from a school bookstore or grocery store) may require minimal approval, purchases from a restaurant or bar may require a medium level of authentication, and purchases of luxury items may require the highest level of authentication.

Figure 7:
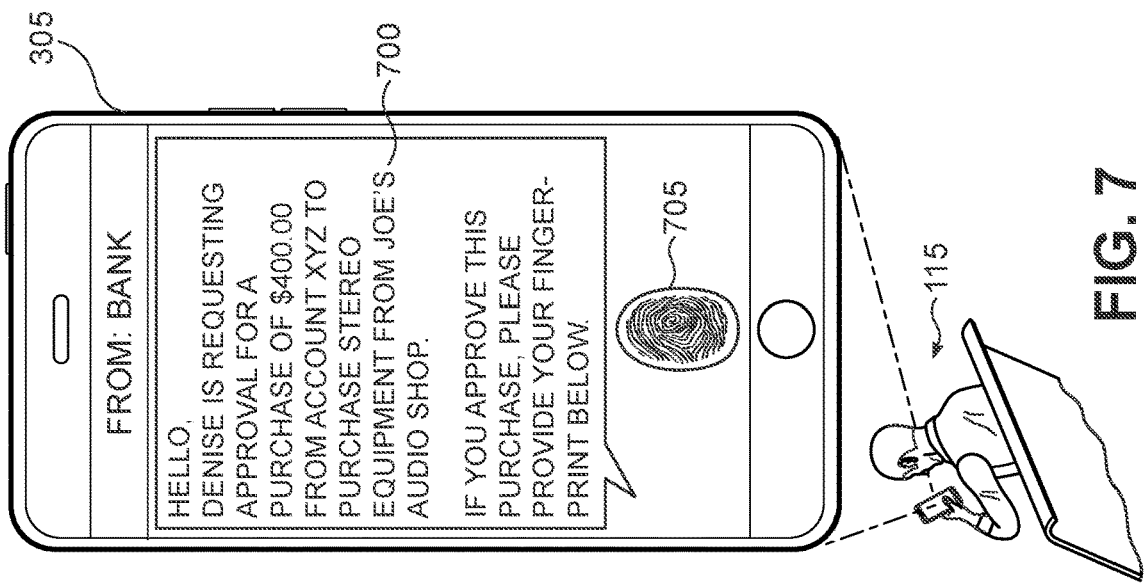
FIG. 7 is a schematic illustration of an account guardian receiving information regarding a purchase requiring third tier authentication that is pending.
Figure 6:
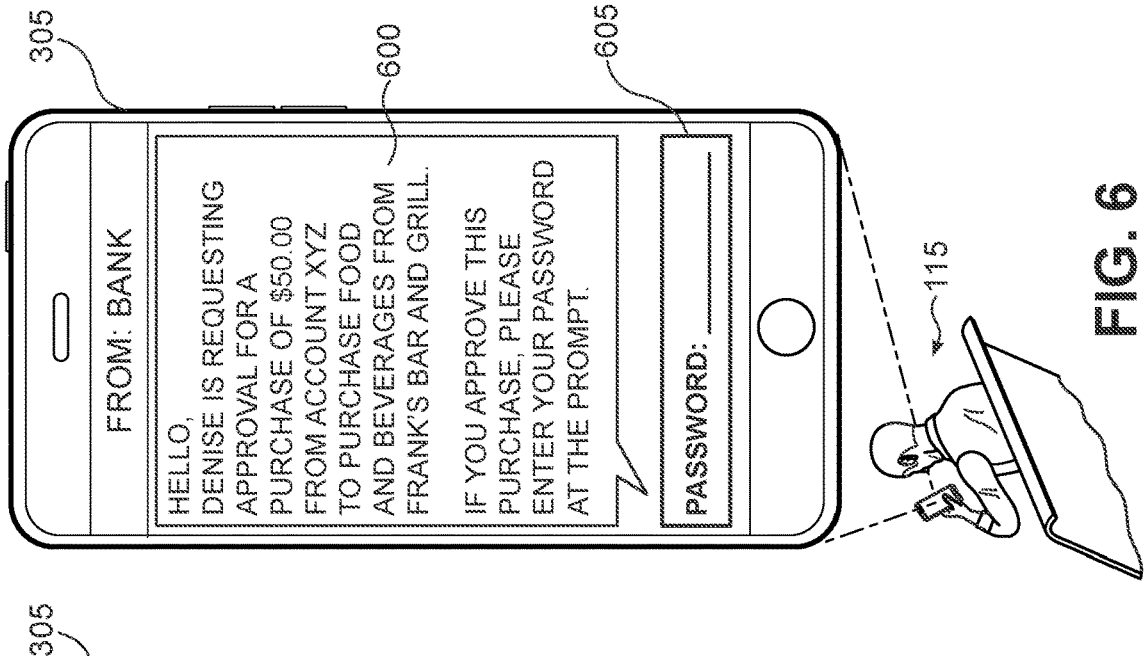
FIG. 6 is a schematic illustration of an account guardian receiving information regarding a purchase requiring second tier authentication that is pending.
Figure 5:
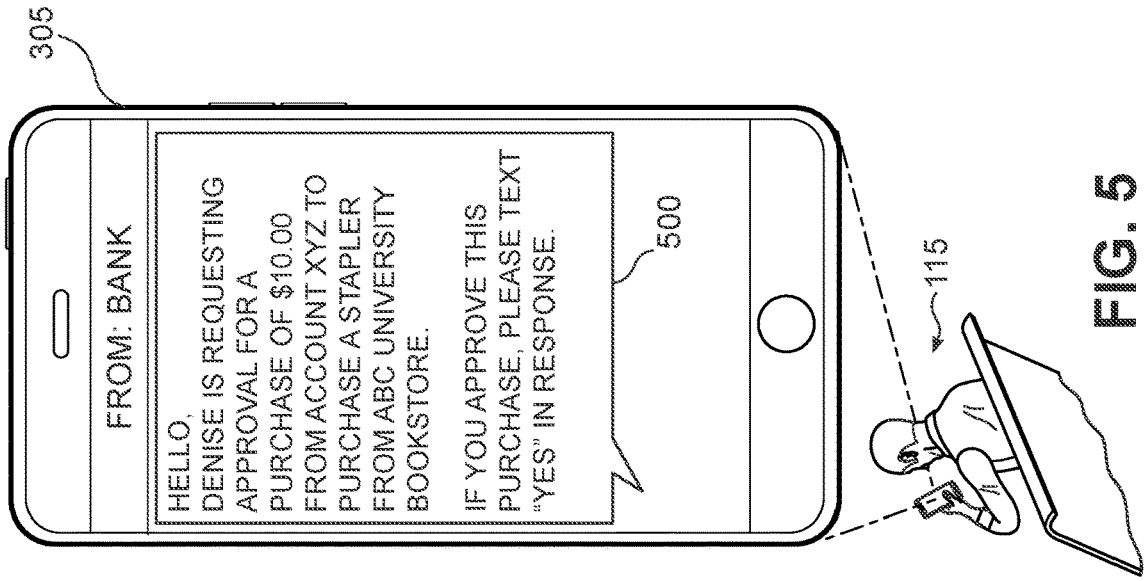
FIG. 5 is a schematic illustration of an account guardian receiving information regarding a purchase requiring first tier authentication that is pending.

FIGS. 5-7 illustrate different levels of authentication required for approval of different types of purchases. Not shown, purchases of small amounts (e.g., less than $10.00) may be automatically approved. In some embodiments, an alert of the small purchase may still be sent to guardian 115. FIG. 5 is a schematic illustration of an account guardian receiving information regarding a purchase that is pending requiring a first tier of authentication. As shown in FIG. 5, a message 500 indicates that a small purchase of $10.00 of an essential item (stapler) from an establishment that sells essentials (school bookstore) can be approved with a simple text response.

FIG. 6 is a schematic illustration of an account guardian receiving information regarding a purchase requiring second tier authentication that is pending. As shown in FIG. 6, a message 600 requests approval for a middle tier amount ($50.00), for possibly essential items (food and beverages) from a middle tier establishment (Frank's Bar and Grill). Because at least one aspect of this purchase falls in the middle tier, the entire purchase is categorized as middle tier, and requires a higher level of authentication. For example, as shown in FIG. 6, a password prompt 605 may be provided in order to authorize the purchase. In some embodiments, more than one aspect of the pending purchase may be required to be middle tier before the purchase will be categorized as middle tier. In some cases, all aspects of the purchase may be required to be middle tier for the purchase overall to be categorized as such.

FIG. 7 is a schematic illustration of an account guardian receiving information regarding a purchase requiring third tier authentication that is pending. As shown in FIG. 7, a message 700 requests approval and authentication for a top tier amount ($400) for non-essential items (stereo equipment) from an establishment that sells non-essential items (Joe's Audio Shop). In order to authenticate and approve this purchase, a fingerprint is required. It will be understood that other forms of high level authentication may be used in certain embodiments, such as voice recognition, facial recognition, retinal scan, etc.

Figure 8:
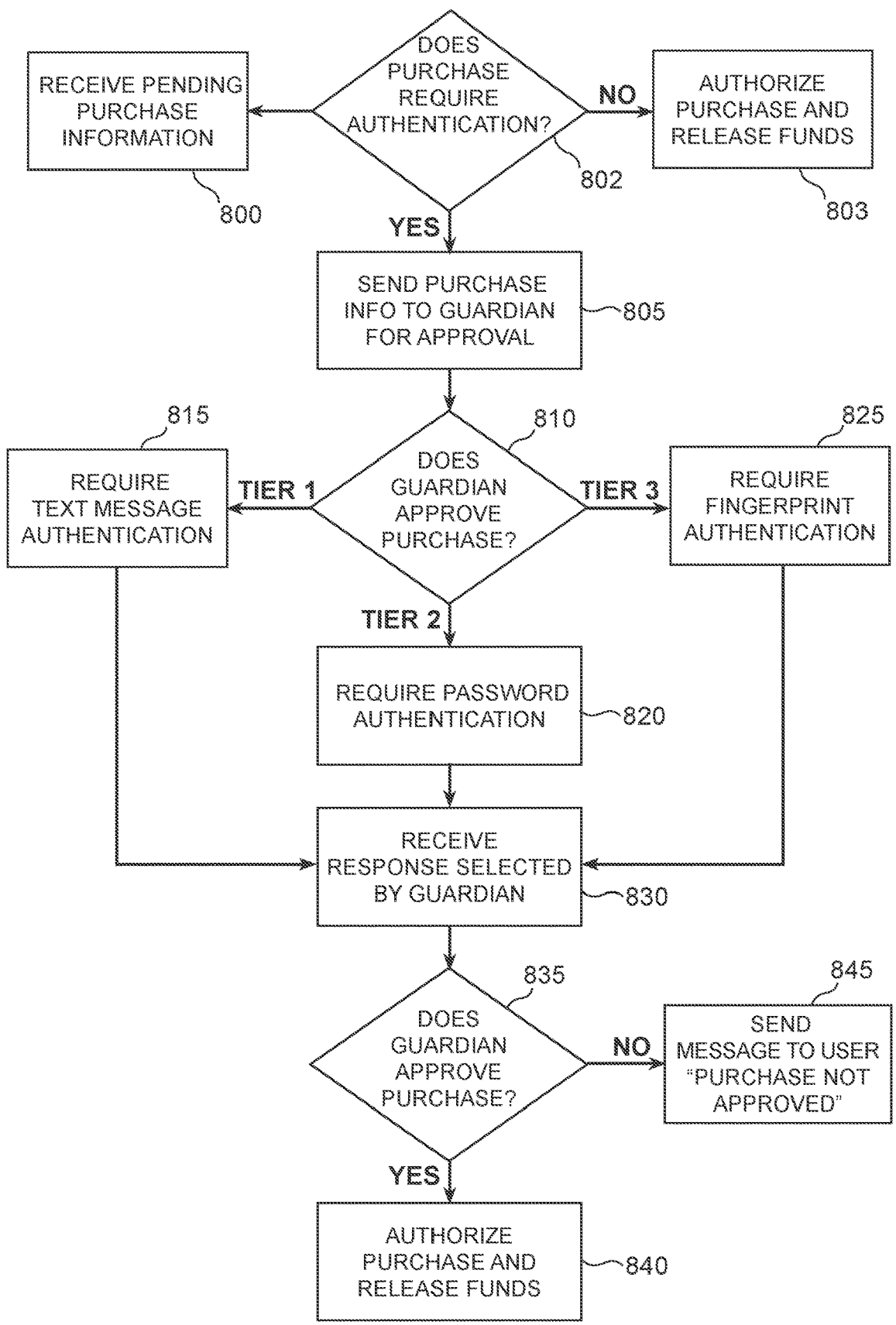
FIG. 8 is a flowchart illustrating a method of banking management according to an exemplary embodiment where purchase information is evaluated on a tiered basis.

FIG. 8 is a flowchart illustrating a method of banking management according to an exemplary embodiment where purchase information is evaluated on a tiered basis. As shown in FIG. 8, pending purchase information is received by the system. (Step 800.) First, the query is made as to whether or not this is a purchase that even requires approval from an account guardian. (Step 802.) If not, the purchase is authorized and the funds are released. (Step 803.) If so, the method proceeds to step 805, where the purchase information is sent to an account guardian for approval. At step 810, a determination is made as to which tier of authentication is required for the purchase. If the purchase only requires first tier authentication, the method proceeds to step 815 and a text message (or other low level authentication) is required of the guardian for approval. If the purchase is categorized as tier 2, then the method proceeds to step 820 where a password (or other mid-level authentication) is required. If the purchase is categorized as tier 3, the method proceeds to step 825 where a fingerprint (or other high level authentication) is required.

If the necessary authentication is provided within the designated tier, the method proceeds to step 830, where the system receives the response selected by the guardian. Next, at step 835, the query is made as to whether the guardian approves the purchase. If so, the purchase is authorized and the funds are released. Step 840. If not, a message may be sent to the user "PURCHASE NOT APPROVED."

In some embodiments, there may be more than one guardian for a given account. For example, both a father and mother may have oversight of a child's account use. Similarly, all high level managers may have oversight of corporate account use by employees. In some cases, the different account guardians may have different levels of approval authority. For example, the CEO may have ultimate authority over a corporate account, but a mid-level manager may only have approval rights for purchases up to a certain monetary value.

In some embodiments, the system may be configured to tabulate responses of the guardians. In some cases, approval of only a single guardian may be required, regardless of whether other guardians decline the request or abstain from responding.

In other cases, if there are conflicting responses, one or more analyses may be performed in order to determine whether the purchase will be approved. In some cases, a purchase may be approved if persons with the highest level of approval authority approve the purchase, regardless of how other guardians respond. In some cases, conflicting responses (e.g., of same level authority) may default to a denial so that the conflicting guardians can discuss and work out their differences regarding the purchase. In some cases, a consensus may be required. That is, if enough of the designated guardians agree to the purchase, than the purchase will be approved. In some cases, a point system may be used, where each approval is assigned a predetermined number of points. If enough points are accumulated for guardian responses, the purchase will be approved.

Figure 9:
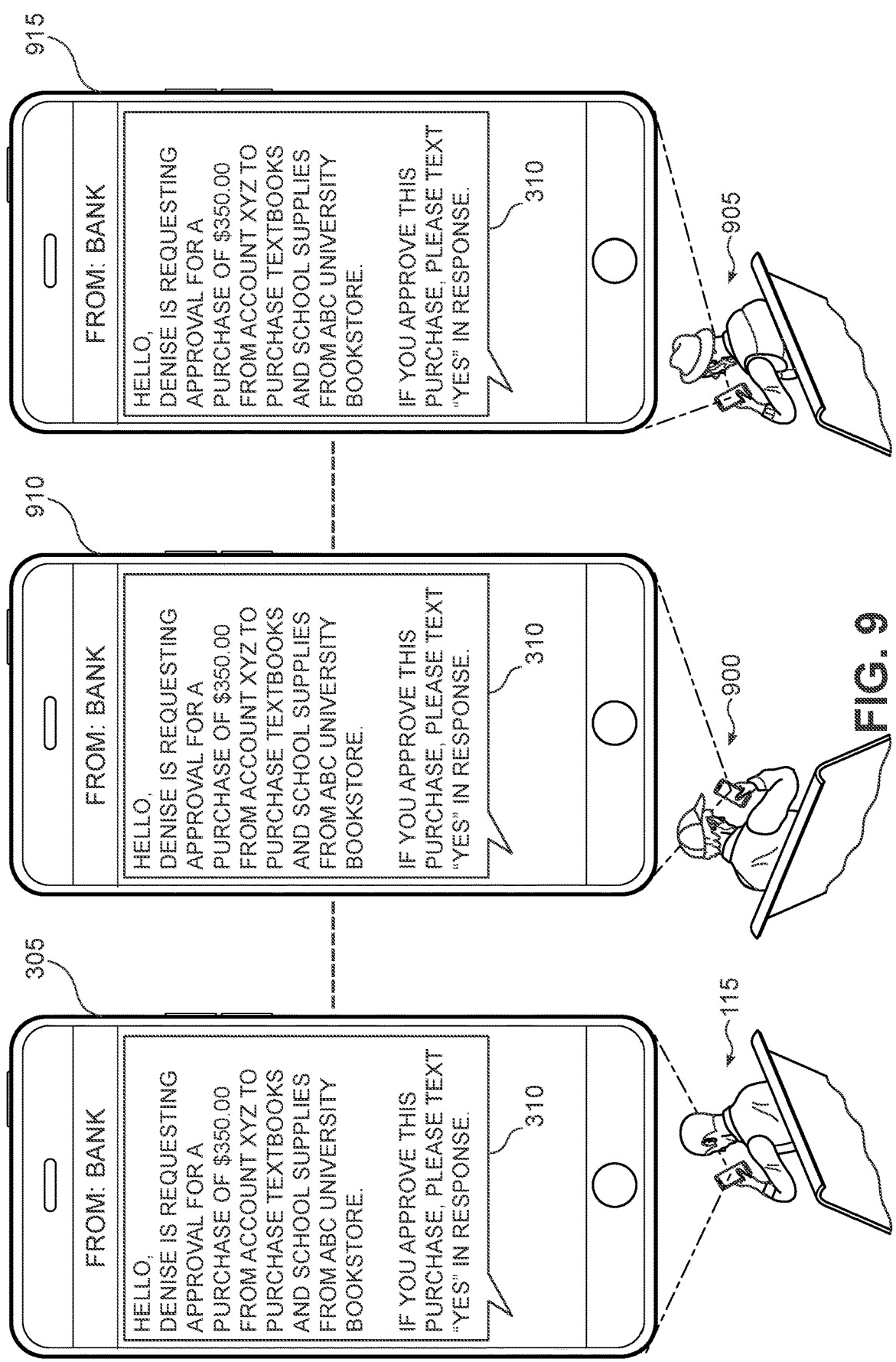
FIG. 9 is a schematic illustration of three different guardians of the same account receiving the same information regarding the same pending purchase.

FIG. 9 is a schematic illustration of three different guardians of the same account receiving the same information regarding the same pending purchase. As shown in FIG. 9, three different guardians are receiving the same message 310 regarding a pending purchase. In addition to primary guardian 115, a second guardian 900 and a third guardian 905 are also receiving message 310. As illustrated in FIG. 9, second guardian 900 may be receiving message 310 on their personal electronic device 910. Similarly, third guardian 905 may receive message 310 on their personal electronic device 915.

Figure 10:
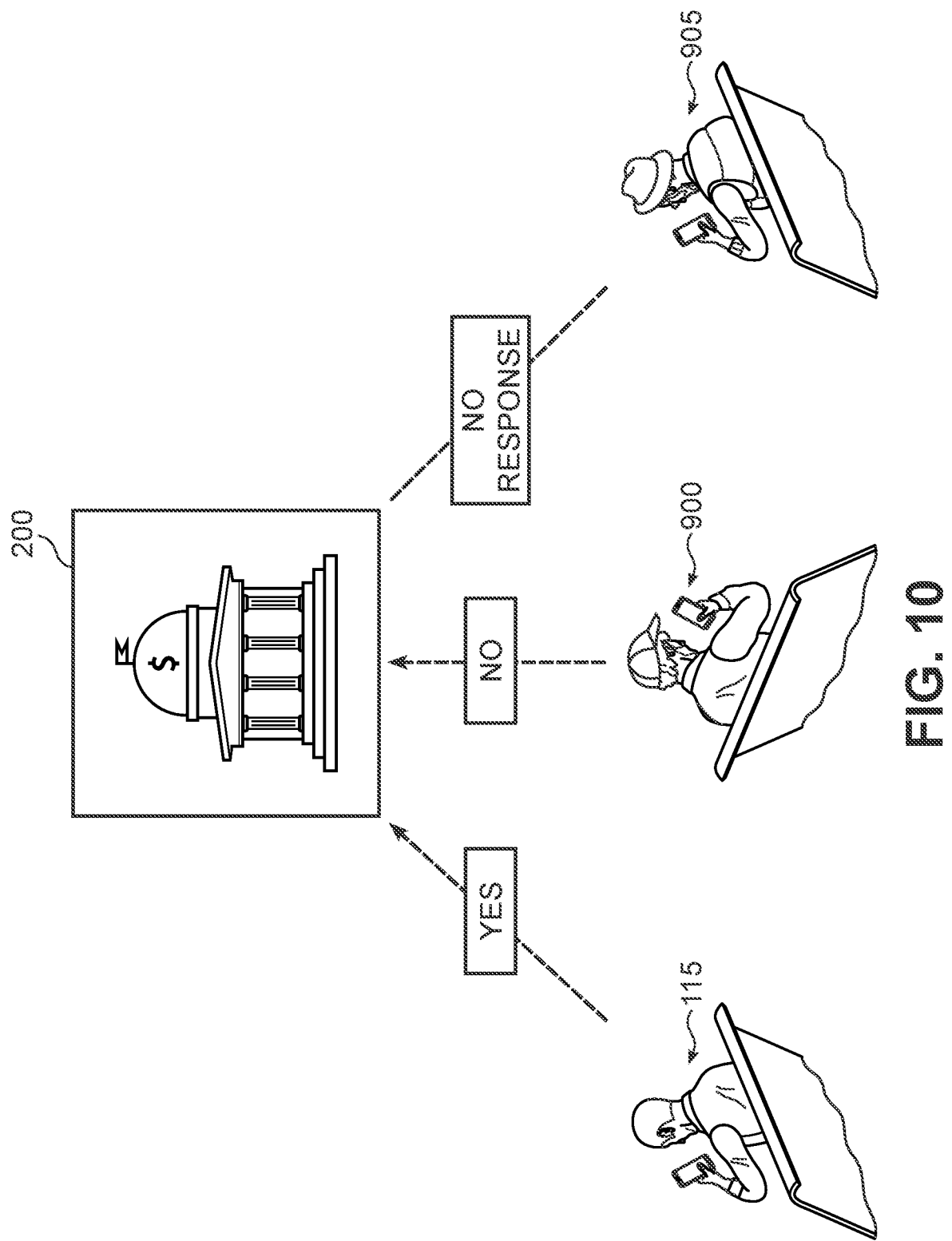
FIG. 10 is a schematic illustration of the three different guardians from FIG. 9 sending responses to the financial management system.

FIG. 10 is a schematic illustration of the three different guardians from FIG. 9 sending responses to the financial management system. As shown in FIG. 10, primary guardian 115 may send a response of "YES," second guardian 900 may send a response of "NO," and third guardian may not respond at all. As discussed above, these responses may be tabulated and a determination will be made as to whether the purchase is approved based on these responses, the authorities of the respective guardians, the predetermined parameters of the system, any customized settings that are made in the system, and any other suitable factors that may be considered.

Figure 11:
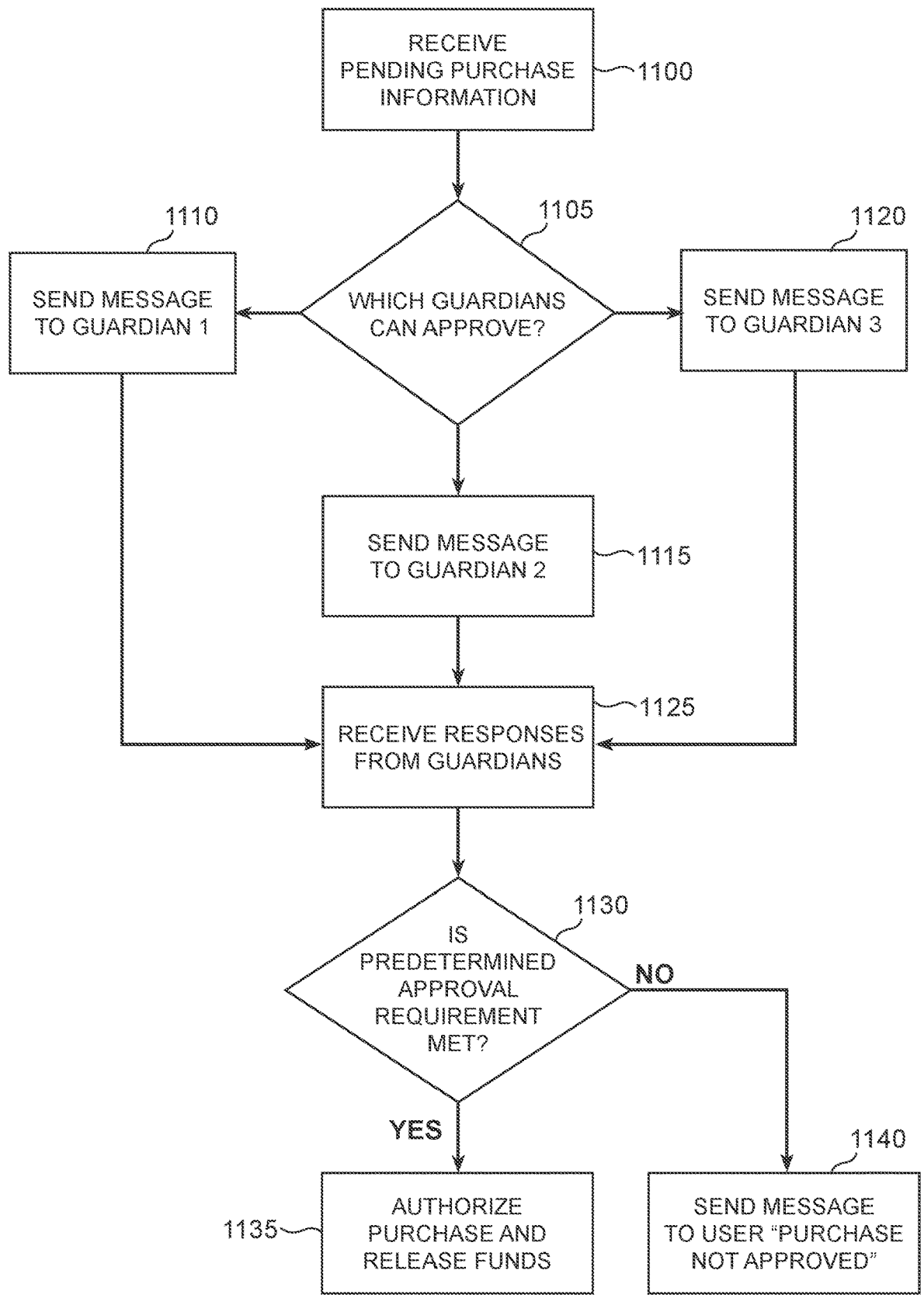
FIG. 11 is a flowchart illustrating a method of banking management according to an exemplary embodiment where multiple guardians are queried.

FIG. 11 is a flowchart illustrating a method of banking management according to an exemplary embodiment where multiple guardians are queried. As shown in FIG. 11, the system may receive information regarding a pending purchase at step 1100. The system may then determine which guardians have authorization to approve such a purchase. (Step 1105.) The system may send a message regarding the purchase to guardian 1 (step 1110), to guardian 2 (step 1115), and/or guardian 3 (step 1120). At step 1125, responses from one or more of these guardians may be received.

These responses may be tabulated and, at step 1130, a determination may be made as to whether the predetermined requirements have been met for approval of the purchase. If so, then at step 1135 the purchase may be authorized and the funds may be released. If not, then the system may send a message to the user indicating that the purchase has not been approved.

In some embodiments, the system may be configured to track the whereabouts and other behaviors of a system user, and present guardians with the option to provide the user a monetary reward, such as a cash contribution or a voucher for a business establishment. In some embodiments the system may receive information from a third party system regarding the whereabouts of the user over a predetermined period of time. For example, the security systems at universities often have tracking capabilities, where use of a security tag is required to enter the various facilities. Thus, the system may track how much time the user is spending in the library, fitness center, etc. The guardian may be presented with the option to reward the user for a healthy lifestyle, diligent study habits, or other positive behavior. In some embodiments, this may be based on data obtained from a personal electronic device of the user, such as their smart phone or wearable devices (e.g., smart watch, fitness band, etc.).

Figure 12:
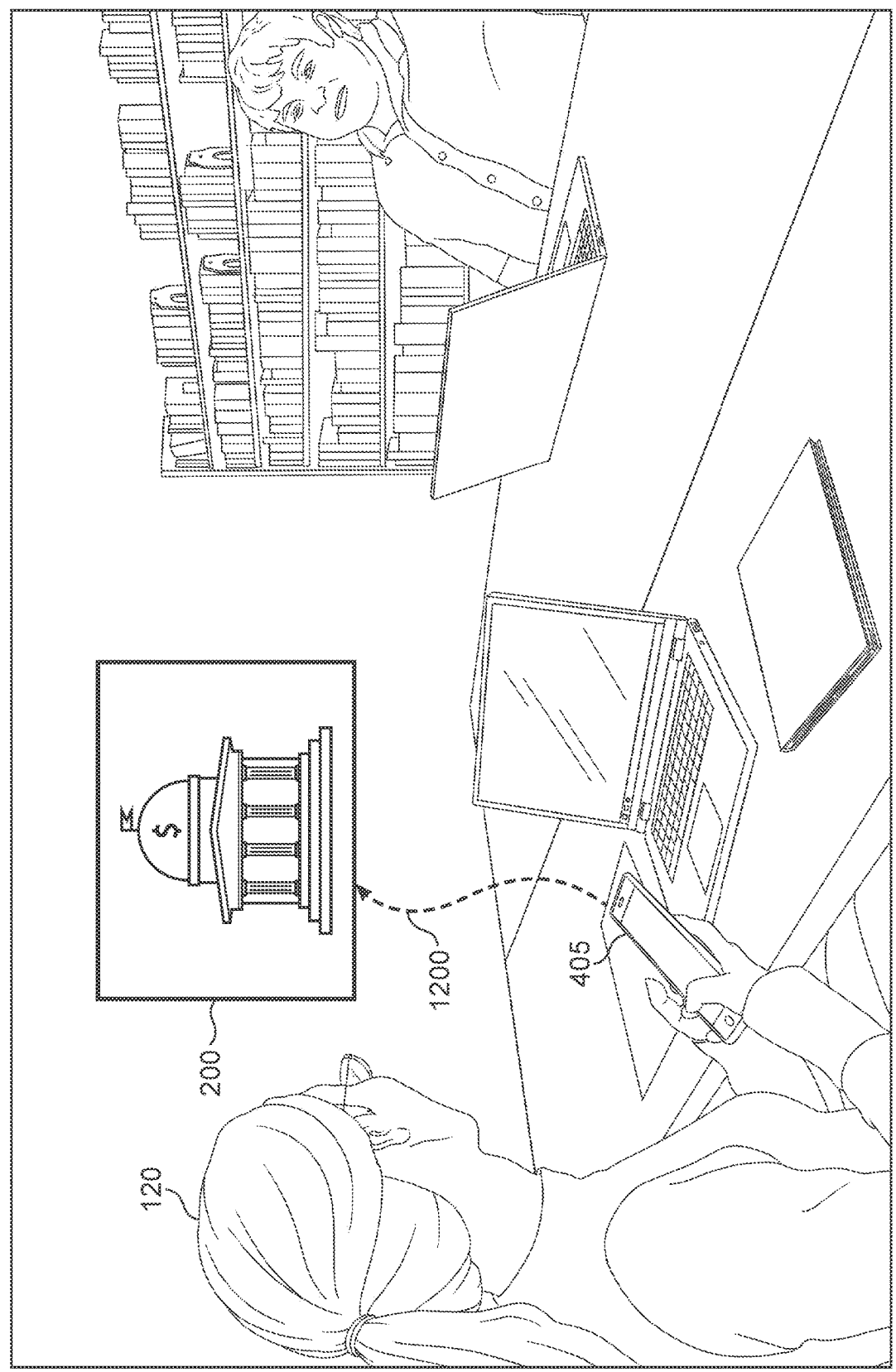
FIG. 12 is a schematic illustration of the system user in the library where their phone is communicating its position to the financial management system.

FIG. 12 is a schematic illustration of the system user in the library where their phone is communicating its position to the financial management system. As shown in FIG. 12, user 120 is in the library and her personal electronic device 405 is communicating her whereabouts to system 200. As discussed above, as an alternative, system 200 may receive information from the security system of the university, which tracks who enters and exits the library and when.

Figure 13:
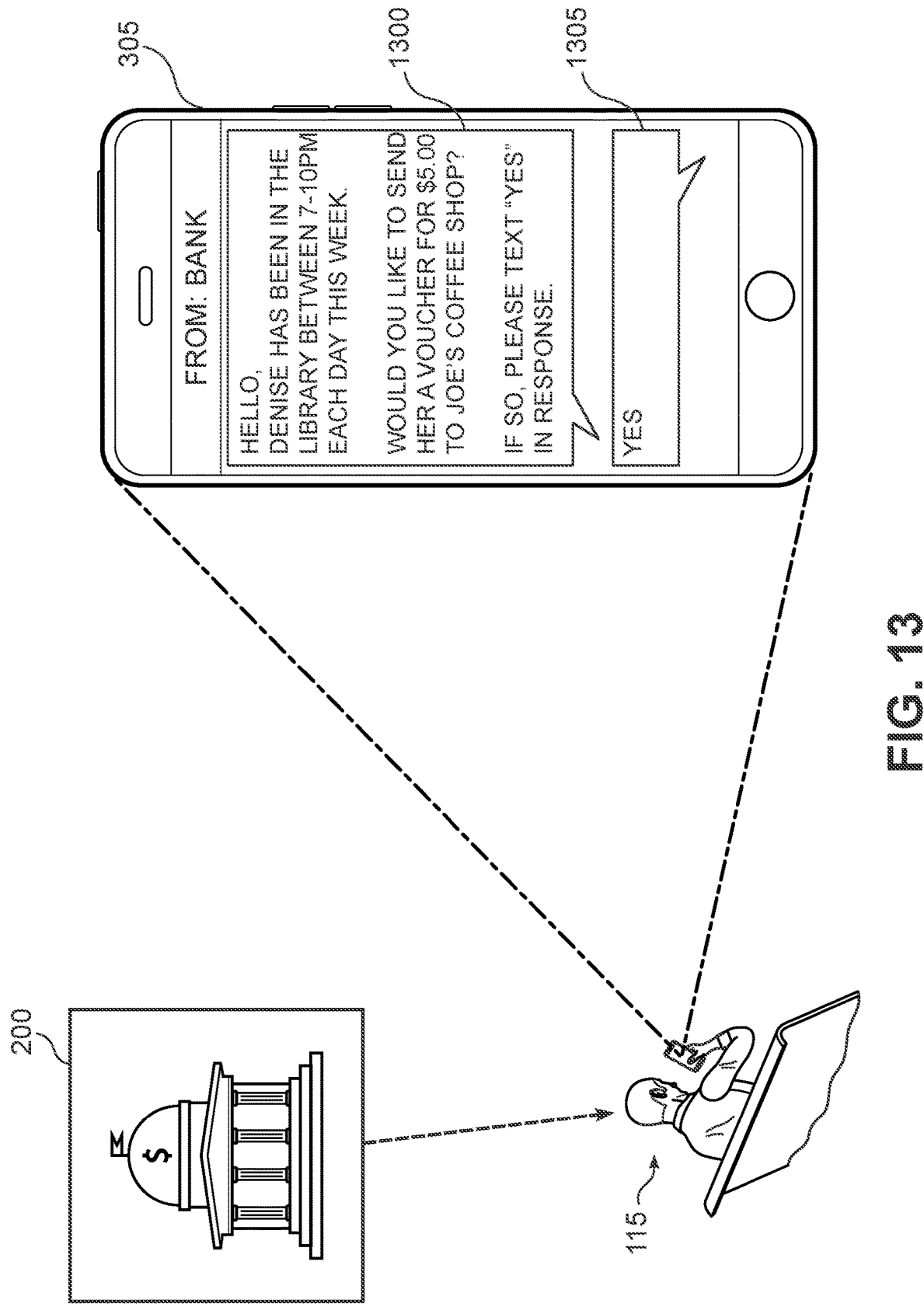
FIG. 13 is a schematic illustration of the guardian receiving information regarding the user's activity and presenting an option to send a reward to the user.

FIG. 13 is a schematic illustration of the guardian receiving information regarding the user's activity and presenting an option to send a reward to the user. As shown in FIG. 13, system 200 may send information regarding the actions of the user to guardian 115, along with a proposal to send the user a financial award based on the information regarding the actions of the user. In this case, a message 1300 send to personal electronic device 305 of guardian 115 notifies guardian 115 that Denise has been in the library between 7-10 pm each day this week and asks guardian 115 whether they would like to send Denise a voucher for $5.00 to a coffee shop. As shown in FIG. 13, guardian 115 may respond by simply sending a message 1305 "YES." In some cases, the proposed award may be related to the activity of the user. For example, the system may propose coffee because the user may be up late frequently or because finals are coming up. This rationale may be communicated to the guardian.

Figure 14:
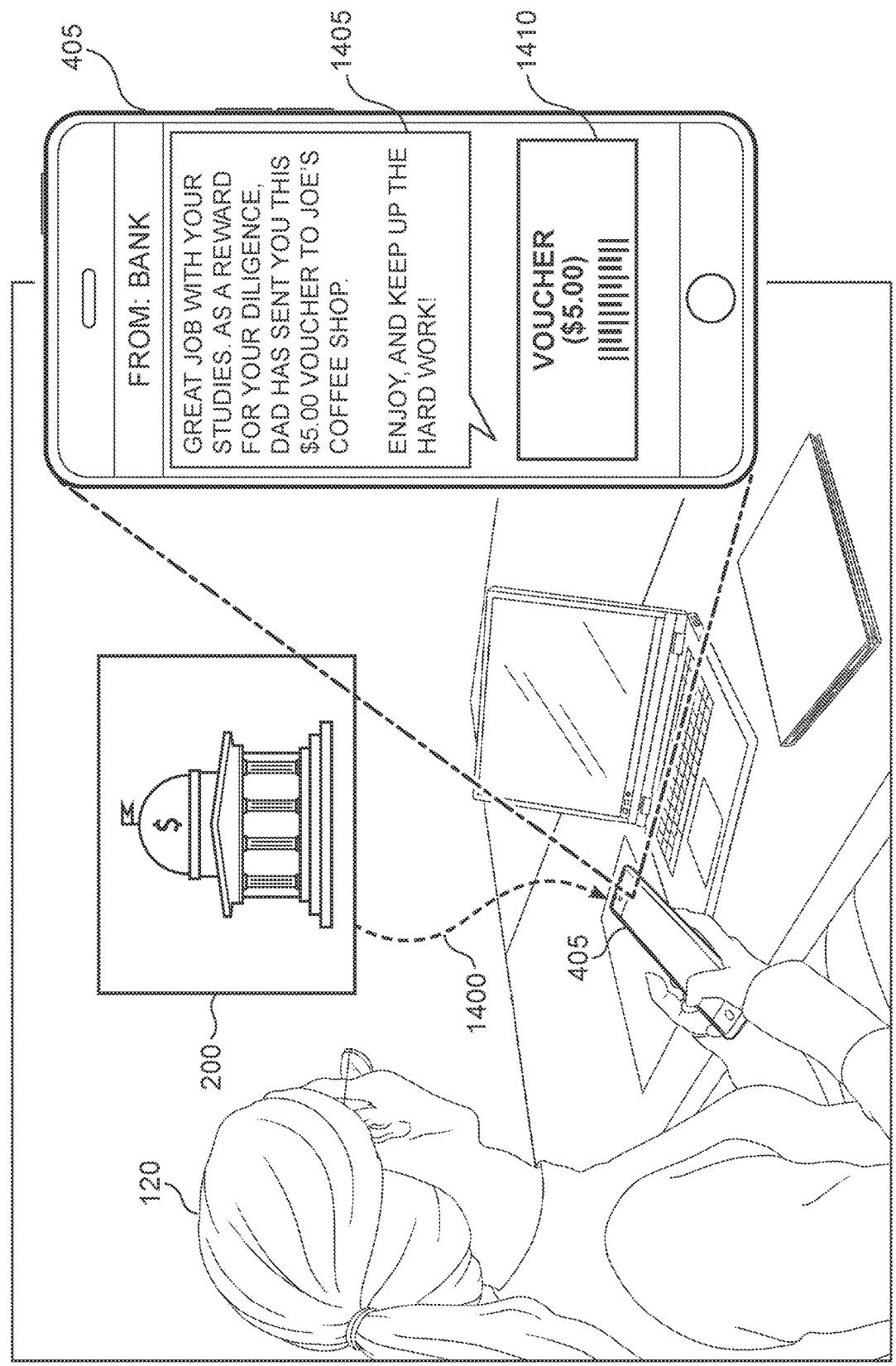
FIG. 14 is a schematic illustration of the user receiving the reward from the guardian.

FIG. 14 is a schematic illustration of the user receiving the reward from the guardian. As shown by an arrow 1400 in FIG. 14, system 200 may send a message 1405 to user 120. Message 1405 may indicate that they have been sent a financial award. In this example, the award is a voucher for a coffee shop and is a reward for diligent study habits. The voucher may appear as a separate pop-up window 1410, for example, with a barcode to be scanned at the coffee shop. It will be appreciated that other types of monetary awards may be given using this feature.

Figure 15:
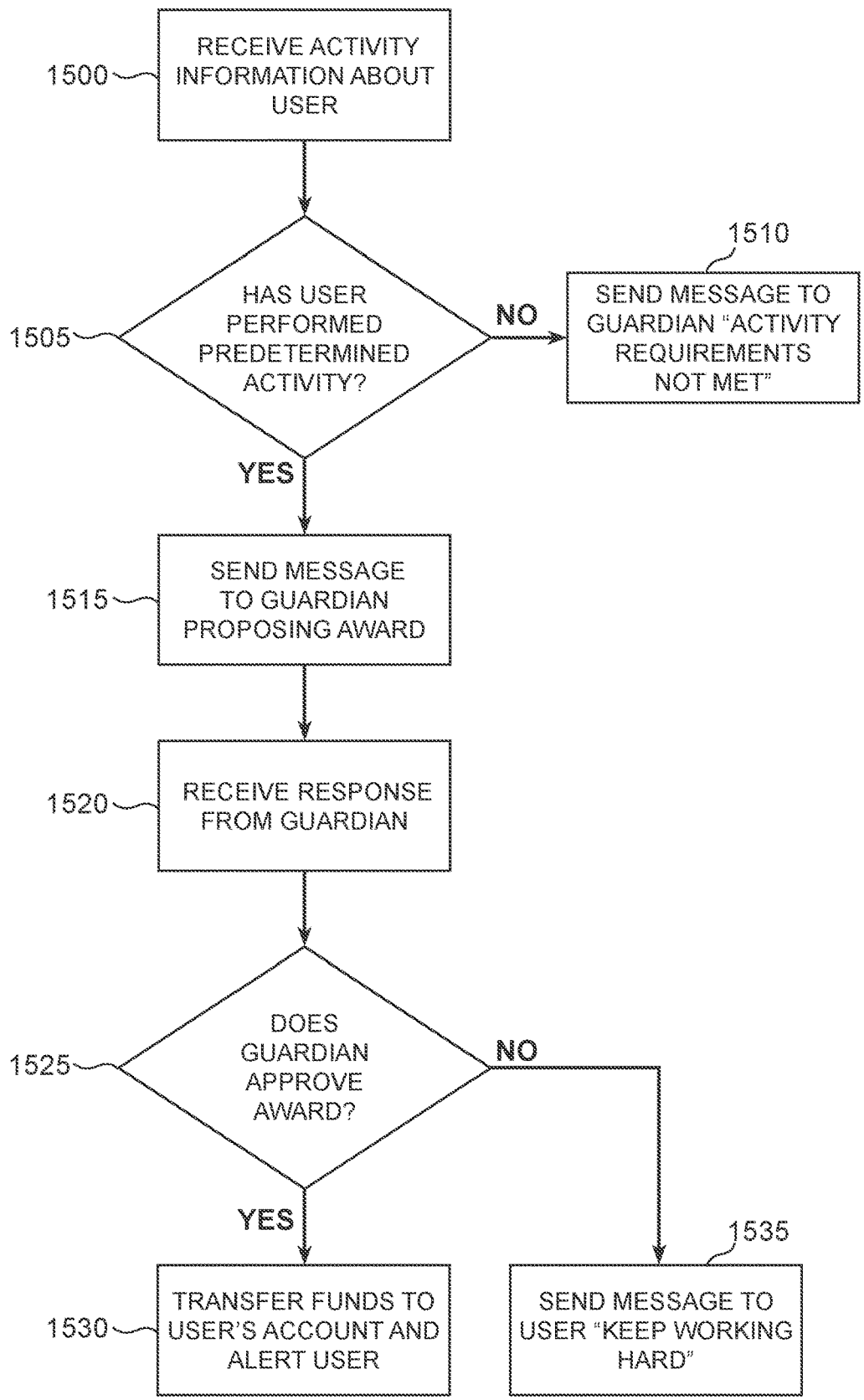
FIG. 15 is a flowchart illustrating a method of banking management according to an exemplary embodiment in which the guardian may reward the user for positive activity.

FIG. 15 is a flowchart illustrating a method of financial management according to an exemplary embodiment in which the guardian may reward the user for positive activity. As shown in FIG. 15, the system may receive information about the user's activity. (Step 1500.) The system may then inquire whether the user has performed some predetermined activity that will trigger a reward prompt. (Step 1505.) If not, at step 1510, the system may send a message alerting the guardian that the predetermined activity requirements were not met. For example, the message may indicate that "Denise was not in the library two days this week." If, on the other hand, the predetermined requirements were met, at step 1515, the system may send a message to the guardian proposing a financial award. At step 1520, a response may be received from the guardian. The system then inquires, at step 1525, whether the guardian approves the award. If so, the system transfers the funds to the user's account or provides a voucher or other monetary award and alerts the user. (Step 1530.) If not, then the system may send the user a message that says something like "KEEP WORKING HARD."

This disclosure discusses various functions of a financial management system including tiered authorization for purchases, consultation of multiple guardians for approval, and provision of rewards for monitored activities. It will be understood that any two or more of these features may be utilized together in the same system. For example, tiered authorization and multiple guardians may be used in the same system for the same transactions. In addition, in some embodiments, monetary rewards may be provided in systems that use tiered authorization, multiple guardians, or both.

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

I claim:

1. A purchase authorization and communication system, comprising:
    a controller computing device, the controller computing device being in electronic communication with a smartphone;
    the controller computing device being configured to:
    receive purchase information regarding a pending purchase of a system user using an account;
    send the purchase information, along with a request for approval of the purchase, to the smartphone, the smartphone being associated with a guardian of the account;
    wherein the smartphone is configured to receive an input from the guardian indicating whether the request for approval is approved or denied;
    receive a response selected by the guardian from the smartphone;
    selectively permit the purchase based on the response selected by the guardian; and
    send to the smartphone an option for the guardian to match funds of the pending purchase by contributing an equal amount to an account associated with the system user.

2. The system of claim 1, wherein the controller computing device is further configured to receive different levels of authentication for different types of purchases.

3. The system of claim 2, wherein the controller computing device is further configured to receive different levels of authentication for purchases of different amounts.

4. The system of claim 2, wherein the controller computing device is further configured to receive different levels of authentication for purchases of different things.

5. The system of claim 1, wherein the controller computing device is further configured to:
    categorize a pending purchase;
    determine one or more guardians having authorization to approve the category of purchase that is pending; and
    send a request for approval to all guardians determined to have authorization to approve the category of purchase that is pending.

6. The system of claim 5, wherein the controller computing device is further configured to:
    receive responses from more than one guardian regarding the pending purchase; and
    determine, based on the received responses, whether the pending purchase is approved.

7. The system of claim 5, wherein the controller computing device is further configured to limit approval authority differently for different guardians.

8. The system of claim 1, wherein the smartphone is configured to receive the input from the guardian in the form of one or more of: voice recognition, facial recognition, a retinal scan, and a fingerprint scan.

9. A method of purchase authorization and communication, comprising:
    receiving purchase information regarding a pending purchase of a system user using an account;
    sending the purchase information, along with a request for approval of the purchase, to a smartphone associated with a guardian of the account;
    receiving a response selected by the guardian and inputted into the smartphone by the guardian;
    selectively permitting the purchase based on the response selected by the guardian; and
    presenting the guardian with an option to match the funds of the pending purchase by contributing an equal amount to an account of the system user.

10. The method of claim 9, further including receiving different levels of authentication for different types of purchases.

11. The method of claim 10, further including receiving different levels of authentication for purchases of different amounts.

12. The method of claim 10, further including receiving different levels of authentication for purchases of different things.

13. The method of claim 9, further including:
    categorizing a pending purchase;
    determining one or more guardians having authorization to approve the category of purchase that is pending; and
    sending a request for approval to all guardians determined to have authorization to approve the category of purchase that is pending.

14. The method of claim 13, further including:
    receiving responses from more than one guardian regarding the pending purchase; and determining, based on the received responses, whether the pending purchase is approved.

15. The method of claim 13, further including limiting approval authority differently for different guardians.

16. The method of claim 9,
wherein the smartphone is configured to receive the input from the guardian in the form of one or more of: voice recognition, facial recognition, a retinal scan, and a fingerprint scan.

* * * * *